# 2,719,862
Patented Oct. 4, 1955

2,719,862

SUBSTITUTED GLYCINAMIDES

William F. Bruce, Havertown, and Joseph Seifter, Melrose Park, Pa., assignors to American Home Products Corporation, New York, N. Y., a corporation of Delaware No Drawing. Application April 16, 1953,
Serial No. 349,314

1 Claim. (Cl. 260—562)

This invention relates to new substituted glycinamides of the type having the formula

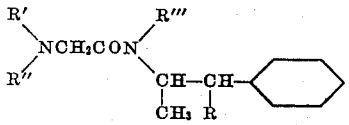

which had been found to be therapeutically active, demonstrating substantial vasoconstrictor action.

In the formula as given above, R', R" and R'" are intended to stand for lower alkyl radicals having not more than 3 carbon atoms in the alkyl chain and, preferably, R' and R" represent alkyls of 2 to 3 carbon atoms while R'" preferably represents a methyl radical. The radical R is intended to stand for either hydrogen or a hydroxy radical.

In general, the compounds of the invention may be synthesized by reacting an appropriate chloracetamide corresponding to the formula

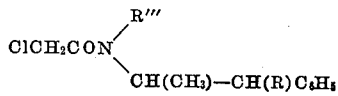

with an appropriate secondary amine R'R"NH where R', R", R'" and R designate the radicals indicated hereinabove.

The secondary amine may be prepared in the usual and known manner. The preferred method for the preparation of the chloracetamide intermediate involves reacting chloracetyl chloride with a secondary amine

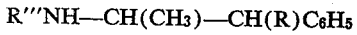

in the presence of benzene or ether as a solvent for the reactants. Heating may or may not be necessary depending on the speed of the particular reaction. The chloracetamide remains in solution in the solvent and is obtained by distilling off the solvent under reduced pressure. In general, a molar ratio of chloride to amine of about 1:2 is preferred for the reaction.

The reaction of the appropriate chloracetamide and the appropriate secondary amine to form the desired substituted glycinamide is preferably operated with a molar ratio, amide to amine of about 1:1 and is carried out in the presence of a solvent for the reactants such as higher alcohols having 4 to 7 carbon atoms in the molecule, dioxane or hydrocarbon solvents such as xylene. The amount of solvent used is so selected as to not only dissolve the reactants but to have a sufficient amount for refluxing. The reaction is carried out in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing temperature of the particular solvent selected. Generally, a reaction or refluxing time of about 10–15 hours is sufficient for complete reaction. In the event that solids are formed, these are removed by filtration, the substituted glycinamide product remaining in solution in the solvent. The latter is finally removed by distillation at low pressures to obtain the desired product.

Proceeding to a better understanding of the invention, illustrative specific procedures for the preparation of representative compounds falling within the general formula are set forth in the following examples.

EXAMPLE 1

*Preparation of diethylamino-N-methyl-N-2-hydroxy-1-methyl-2-phenethyl acetamide*

To 400 cc. of butanol contained in a one liter three-neck flask fitted with a mechanical stirrer, reflux condenser and thermometer, was added 7.3 gr. of diethylamine; 24.1 gr. of chloro-N-methyl-(2-hydroxy-1-methyl-2-phenethyl) acetamide, and 30 gr. of sodium carbonate. The reaction mixture was refluxed overnight. The inorganic salts were filtered off while hot, and washed with butanol. The filtrate was washed once with dilute sodium hydroxide solution, and three times with water. The filtrate was dried over magnesium sulfate and the butanol was distilled off under vacuum. The residue was also distilled under vacuum. B. P.=156–170°/0.8 mm. (superheating); N=calc'd: 10.07; found: 9.91%.

EXAMPLE 2

*Preparation of diisopropylamino-N-methyl-N-1-methyl-2-phenethyl acetamide*

To 300 cc. of n-butyl alcohol contained in a one liter flask, fitted with a mechanical stirrer and reflux condenser, was added 45 gr. of crude chloracetodesoxyephedrine, 21 gr. of di-isopropylamine, and 60 gr. of sodium carbonate. The chloracetodesoxyephedrine was prepared from chloracetylchloride, desoxyephedrine and pyridine.

The reaction mixture was refluxed overnight. It was then filtered hot to remove the inorganic salts. The salts were then washed with butyl alcohol and the washings added to the filtrate. The product was fractionated to obtain the desired acetamide. B. P.=160–165° C./2 mm.

Substantially all of the products of the invention are high boiling basic liquids of limited solubility. It is contemplated that while the products may be used in the basic form, it is within the scope of the invention that they may be prepared and used in the form of their acid-addition salts. The preparation of an acid-addition salt is well-known and generally involves the addition of the selected acid to an ether, alcohol or water solution of the basic material. When medicinal compounds are contemplated, the acid is chosen to yield a salt which is known to those skilled in the art as being physiologically non-toxic. As examples, the hydrochloride, sulfate or acetate salts of the products may be used.

It is further contemplated that those substituted glycinamides which are less soluble in dilute acid than 0.5% by weight or the non-toxic salts thereof, may be brought into satisfactory solution by the use of solubilizing, surface-active, emulsifying or detergent agents in order to obtain a more complete physiological effect of the specific substituted glycinamide. Lipoid solvents having a physiologically non-toxic effect such as long-chain fatty acid partial esters of hexitol anhydrides or oxyalkylene derivatives thereof, vegetable and animal oils and ointment bases such as petroleum jelly and cholesterol are examples of solvents that have been found useful in admixture with the substituted glycinamides for obtaining an enhanced physiological effect.

We claim:

The compound selected from the group consisting of diethylamino - N - methyl - N - 2 - hydroxy - 1 - methyl - 2 - phenethyl acetamide and the non-toxic acid addition salts thereof.

References Cited in the file of this patent

UNITED STATES PATENTS 2,665,309     Bruce et al. _____ Jan. 5, 1954

OTHER REFERENCES

Chiaverelli et al.: "Gazz. Chim. Ital.," vol. 81 (1951), pp. 89 to 97.